United States Patent
Niitsuma

(10) Patent No.: US 8,269,995 B2
(45) Date of Patent: Sep. 18, 2012

(54) IMAGE FORMING APPARATUS AND APPARATUS FOR PERSONAL IDENTITY AUTHENTICATION

(75) Inventor: Tetsuya Niitsuma, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1578 days.

(21) Appl. No.: 11/058,609

(22) Filed: Feb. 16, 2005

(65) Prior Publication Data

US 2005/0264840 A1    Dec. 1, 2005

(30) Foreign Application Priority Data

Jun. 1, 2004  (JP) ................................. 2004-163014

(51) Int. Cl.
*G06K 15/00* (2006.01)

(52) U.S. Cl. ...... 358/1.14; 358/1.15; 358/403; 382/115; 382/119; 382/124; 340/5.52; 340/5.53; 340/5.54; 340/5.82; 340/5.83; 340/5.85

(58) Field of Classification Search ................. 358/1.14, 358/1.15, 403; 382/115, 124, 119; 340/5.52, 340/5.53, 5.54, 5.82, 5.83, 5.85

See application file for complete search history.

(56) References Cited

U.S. PATENT DOCUMENTS

| 5,956,471 | A  | * | 9/1999  | Ueda et al. ................... 358/1.14 |
| 6,526,396 | B1 | * | 2/2003  | Hiratsuka et al. ............... 706/52 |
| 6,567,852 | B2 | * | 5/2003  | Besaw et al. .................. 709/228 |
| 6,636,975 | B1 | * | 10/2003 | Khidekel et al. ................. 726/10 |
| 6,810,480 | B1 | * | 10/2004 | Parker et al. ................... 713/186 |
| 7,061,631 | B2 | * | 6/2006  | Ozaki .......................... 358/1.13 |
| 2001/0019622 | A1 | | 9/2001 | Huang |
| 2003/0074575 | A1 | | 4/2003 | Hoberock et al. |

FOREIGN PATENT DOCUMENTS

| EP | 0 657 845 A2 | 6/1995 |
| EP | 1 315 076 A2 | 5/2003 |
| JP | 04-048323 | 2/1992 |
| JP | 10-016355 | 1/1998 |
| JP | 10-154131 | 6/1998 |
| JP | 2001-243699 | 9/2001 |
| JP | 2002-321429 | 11/2002 |
| JP | 2002321429 A * | 11/2002 |
| JP | 2003-067339 | 3/2003 |
| JP | 2003-182187 | 7/2003 |
| JP | 2004-013682 | 1/2004 |
| JP | 2004-13682 | 1/2004 |
| JP | 2004-054893 | 2/2004 |
| WO | WO 92/00638 | 1/1992 |

OTHER PUBLICATIONS

European Search Report.

(Continued)

*Primary Examiner* — King Poon
*Assistant Examiner* — Jamares Q Washington
(74) *Attorney, Agent, or Firm* — Finnegan, Henderson, Farabow, Garrett & Dunner, L.L.P.

(57) ABSTRACT

Disclosed is an image forming apparatus that prints a confidential image on a recording medium. The apparatus includes a display, a printer for printing images in a queue, an input for receiving identification information for a user, and a processor. The processor determines whether identification information from the input corresponds to reference identification information in a storage and enables the printer to print a confidential image if the identification information from the input corresponds to the reference identification information in the storage.

11 Claims, 8 Drawing Sheets

OTHER PUBLICATIONS

Official Action from the Japanese Patent Office dated Oct. 6, 2009 in Japanese Patent Application 2004-163014 (3 pages).

English Translation of the Official Action from the Japanese Patent Office dated Oct. 6, 2009 in Japanese Patent Application 2004-163014 (4 pages).

* cited by examiner

IMAGE FORMING APPARATUS AND APPARATUS FOR PERSONAL IDENTITY AUTHENTICATION

BACKGROUND OF THE INVENTION

1. Field of the Invention

The present invention relates to an image forming apparatus and an apparatus for personal identity authentication.

2. Description of Related Art

To maintain security, the personal identities of users may be authenticated. The personal identity may be authenticated by the input of user information using an IC card which has user information recorded in it, or by the input of a password by the user. Further, there have been many proposals of applying personal identity authentication configuration to image forming apparatuses. For example, an image forming apparatus may authenticate the person using it and switch the operation screen based on the personal identity authentication information (Published Japanese Patent Application No. 2004-13682).

In addition, for example, it is also possible to think of an image forming apparatus in which the personal identity is authenticated, the accumulated jobs are filtered based on that authenticated information, and those filtered jobs are displayed as a list of services to the authenticated person (Published Japanese Patent Application No. 2001-243699).

However, the image forming apparatus having the function of switching the operation screen according to the authentication information did not have the configuration of changing the operation based on the state of the apparatus. For example, it was not possible to display the operation screen corresponding to the state in which the private and confidential print jobs have been accumulated for the authenticated person. The operations were likely to become complicated when executing private and confidential print jobs because it was necessary to execute such jobs after confirming the presence or absence of private and confidential print jobs by switching to the normal operation screen by an operational input.

Further, in the conventional image forming apparatus that displays a list after filtering the accumulated jobs, there was the likelihood of causing inconvenience when wanting to carry out first a different job because a job list screen is displayed immediately after carrying out personal identity authentication.

In addition, while carrying out private and confidential print jobs belonging to the authenticated person, the security protection was likely to become incomplete with the likelihood of the printed material being seen or stolen by a third person if the authenticated person went away from the front of the image forming apparatus.

SUMMARY

Considering defects of the conventional techniques, an object of the present invention is to provide a novel apparatus that can satisfactory provide personal identity authentication function. Another object of the present invention is to provide a novel apparatus that have personal identity authentication function with high usability. Another objective of the present invention is to carry out appropriately the execution process of image output jobs in accordance with the personal identity authentication. Another objective is to display an appropriate operation screen according to the presence or absence of private and confidential print jobs addressed to the authenticated person. In addition, another objective is to increase the security protection during the execution of image output jobs.

According to an image forming apparatus consistent with an embodiment of the present invention, the image forming apparatus prints a confidential image on a recording medium. The apparatus includes a display, a printer for printing images in a queue, an input for receiving identification information for a user, and a processor. The processor determines whether identification information from the input corresponds to reference identification information in a storage and enables the printer to print a confidential image if the identification information from the input corresponds to the reference identification information in the storage.

The display may indicate whether a confidential image is in the queue, and may display a short cut key for printing a confidential image when a confidential image is in the queue and when the identification information from the input corresponds to reference identification information in the storage.

The display may prompt the user to re-enter the identification information for the user while the printer prints a confidential image, and the processor may disable the printer from printing confidential information if the input does not receive re-entered identification information from the user that corresponds to the identification information in the storage.

The storage may be provided in the image forming apparatus, or may be provided in an apparatus remote from the image forming apparatus.

According to an apparatus consistent with another embodiment of the present invention, the apparatus comprises an input for receiving identification information for a user, a processor, and user selectable means. The processor determines from first identification information inputted from the input whether the user is to be authenticated, and determines from second identification information inputted from the input whether the user is to be authenticated when the processor have failed to certify the user based on the first identification information. The user selectable means selects whether the authentication of the user based on the second information is to be carried out or not.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention.

FIG. 6(*b*) is a schematic diagram of an operation screen.

DETAILED DESCRIPTION OF PREFERRED EMBODIMENTS

Figure 1:
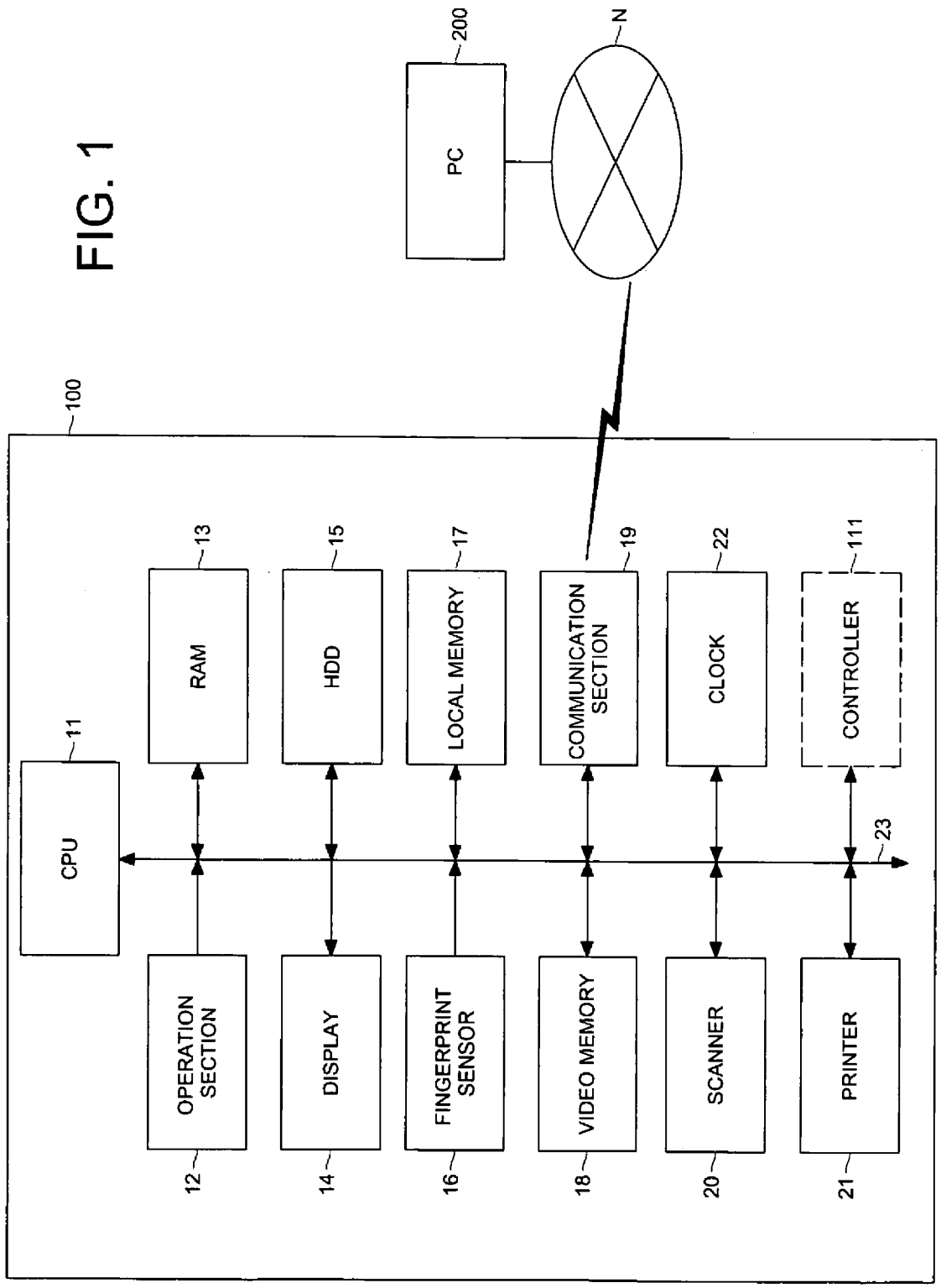
FIG. 1 is a schematic diagram of a multifunction printer.

The described embodiments of an image forming apparatus may achieve several advantages.

Personal identity authentication may be done based on the personal identification information and the appropriate operation screen selected and displayed according to the result of personal identity authentication, the information of the authenticated person, and the presence or absence of the private and confidential print jobs addressed to the authenticated person. Therefore, it is possible to improve the ease of operation using that operation screen and to execute easily the private and confidential print jobs and other image output jobs.

When there is a private and confidential print job, a private and confidential print job may be displayed and at least one of the short cut buttons to the private and confidential print job control screens may be displayed. Therefore, it is possible to improve the ease of operation using that operation screen and to execute private and confidential print jobs easily.

The personal identity authentication may be done based on fingerprint data. Therefore, it is not only possible to carry out personal identity authentication easily and safely, but also to improve the ease of operations.

The personal identity and the input finger of a person may be authenticated based on fingerprint data, and one appropriate selection screen may be selected and displayed from among plural operation screens based on the information of the authenticated input finger. The operation screen would then correspond to each input finger, improving the ease of operation.

The execution of private and confidential print jobs may be restricted when personal identity authentication has failed, thus increasing the security of private and confidential print jobs.

When the personal identity authentication has failed, it is possible to select whether or not to execute private and confidential print jobs and to execute or terminate the execution of print and confidential print jobs according to that selection. Therefore, it is possible to improve the ease of operation while achieving the security of private and confidential print jobs.

During the execution of image output jobs, the personal identity authentication may be done based on personal identification information, and judgment may be made of whether to continue or interrupt the execution of the image output jobs according to the result of that personal identity authentication. Because the execution of that image output job may be continued or interrupted based on the result of that judgment, it is possible to increase the security of image output during the execution of image output jobs.

Before starting the execution of image output jobs, the personal identity authentication may be done based on the personal identification information, and judgment may be made of whether to start or cancel the execution of image output jobs based on the result of the personal identity authentication. Because the starting or canceling of execution of the image output jobs may be done based on the result of that judgment, it is possible to increase the security of image output at the time of starting the execution of or during the execution of image output jobs.

The personal identification information may be carried out repeatedly during the execution of private and confidential print jobs, and may be suspended if personal identity authentication has failed. Therefore, it is possible to increase the security of private and confidential print jobs while executing private and confidential print jobs. For example, if the authenticated person moves away from the front of the image forming apparatus, it is possible to prevent a third person from seeing or steeling private and confidential printed materials.

The personal identity authentication may be done based on the personal identification information before starting the execution of private and confidential print jobs, and the execution of print jobs may be started when the personal identity authentication has succeeded. It is therefore possible to increase the security of private and confidential print jobs at the time of starting and during the execution of private and confidential print jobs.

The personal identity authentication may be made easier when repeating the execution of private and confidential print jobs as compared to the personal identity authentication before starting the execution of private and confidential print jobs. It is therefore possible to make easy the input of personal identification information by the operator during the execution of private and confidential print jobs and to prevent frequent failures of personal identity authentication.

The frequency of authentication may be changed in accordance with a level of security setting of private and confidential print jobs. It is therefore possible to improve the ease of operation while at the same time ensuring the security of private and confidential print jobs.

Because it is possible to select whether or not to carry out repeated person identity authentication during the execution of private and confidential print jobs, it is possible to set selectively whether to enhance the security of private and confidential print jobs or to enhance the ease of operation.

When interrupting the execution of an image output job, the image output job may be stored along with the interrupt state information, and when restarting the execution of that image output job, it may be possible to select whether to restart the execution of the image output job from the interrupted state or to restart it from the very beginning. Therefore, it is possible not only to improve the ease of operation at the time of restarting the execution of an image output job but also to avoid unnecessary printing operations.

A preferred embodiment of the present invention is described in detail in the following by referring to the attached drawings. However, the scope of the present invention shall not be construed to be limited to the examples shown in the figures here.

The configuration of a Multifunction Peripheral (MFP) 100 is shown in FIG. 1.

As is shown in FIG. 1, MFP 100 is an image forming apparatus. According to the present embodiment, the MFP 100 displays an operation screen corresponding to private and confidential print jobs based on personal identity authentication. The MFP 100 carries out personal identity authentication during the execution of private and confidential print jobs and suspends the execution of private and confidential print jobs when that personal identity authentication fails. A communication network N connects the MFP 100 to a personal computer PC 200. The PC 200 enters print jobs in the MFP 100 based on operation instructions, etc. by the operator. In the configuration of the present preferred embodiment, although an MFP is used as the image forming apparatus it is not necessary to restrict to this but it is also possible to have a configuration using equipment, such as printers, photocopiers, digital photocopiers, facsimile machines, etc. possessing the function of at least forming images on a recording medium such as recording paper, etc.

Further, in the present preferred embodiment although PC 200 is shown as external equipment it is not necessary to restrict to this and other equipment can also be used for entering print jobs to the MFP 100 via the communication network N.

Although the communication network N shown here is a LAN (Local Area Network), it is also possible to have configurations wherein the network N is a WAN (Wide Area Network), or PSTN (Public Switch Telephone Network), ISDN (Integrated Services Digital Network), wideband communication line network, dedicated line, mobile communication network, communication satellite line, CATV (Community Antenna Television) line, optical communication line, wireless communication line, or an internet provider connected to any of these.

MFP 100 may include a CPU (Central Processing Unit) 11, an operation section 12, a RAM (Random Access Memory) 13, a display 14, a Hard Disk Drive (HDD) 15, a fingerprint sensor 16, a local memory 17, a video memory 18, a communication section 19, a scanner 20, a printer 21, and a clock 22, with each of these having being connected to the bus 23.

The CPU 11 centrally controls the different sections within the MFP 100. The CPU 11 loads in the RAM 13 a specific program from among the system programs and various types of application programs stored in the local memory 17 or the HDD 15, and executes various types of processings in cooperation with the program loaded in the RAM 13. This entity executing these various types of processings is considered as a controller 111.

Although the controller 111 has been explained here as having been realized in software it is not necessary to restrict it to this but it is also possible to have a configuration in which it is realized by hardware such as circuits, etc.

The operation section 12 is provided with input keys etc., accepts information entered by the user in the form of key operations as the input signals, and outputs those input signals to CPU 11. RAM 13 comprises a work area that stores programs, inputs data and results of processing etc, and temporarily stores information. The display 14 is preferably an LCD (Liquid Crystal Display) and displays various types of information based on display signals from the CPU 11. In particular, the display 14 displays various types of operation screens. Further, it is also possible to have a touch panel and combine the display 14 with the operation section 12.

The HDD 15 stores various types of data such as image data and various types of programs in a readable and writable form. The local memory 17 stores data used in the MFP 100, and is composed of a memory such as a flash memory that stores data in a readable and writable form or a ROM (Read Only Memory) that stores data that do not need to be rewritten. The video memory 18 temporarily stores image data.

The fingerprint sensor 16 reads the fingerprint from a finger of the user, generates fingerprint data identifying that fingerprint, and outputs the fingerprint data to the CPU 11. Although in the present preferred embodiment the fingerprint data is considered to be read out with the finger placed on the sensor, it is also possible to have a sweep type of reading out in which the fingerprint data is read by sliding the finger. The communication section 19 is configured using an NIC (Network Interface Card) etc., and sends and receives various types of data to/from external equipment such as PC 200 via the communication network N.

The scanner 20 reads images recorded on a document and generates image data of those images. The scanner 20 comprises an image reader such as a CCD (Charge Coupled Device) image sensor, a scanning conveyor that moves the image reader, and an image processor that carries out various types of conversions and processings on the signals read out by the image reader. The printer 21 is preferably of the ink jet type, laser type, thermal transfer type, or dot matrix type. The printer 21 records images on a recording medium such as recording paper etc., based on the image data input from the CPU 11.

The clock 22 has the timer functions of starting, resetting, and counting timers based on instruction information from the CPU 11.

Figure 2:
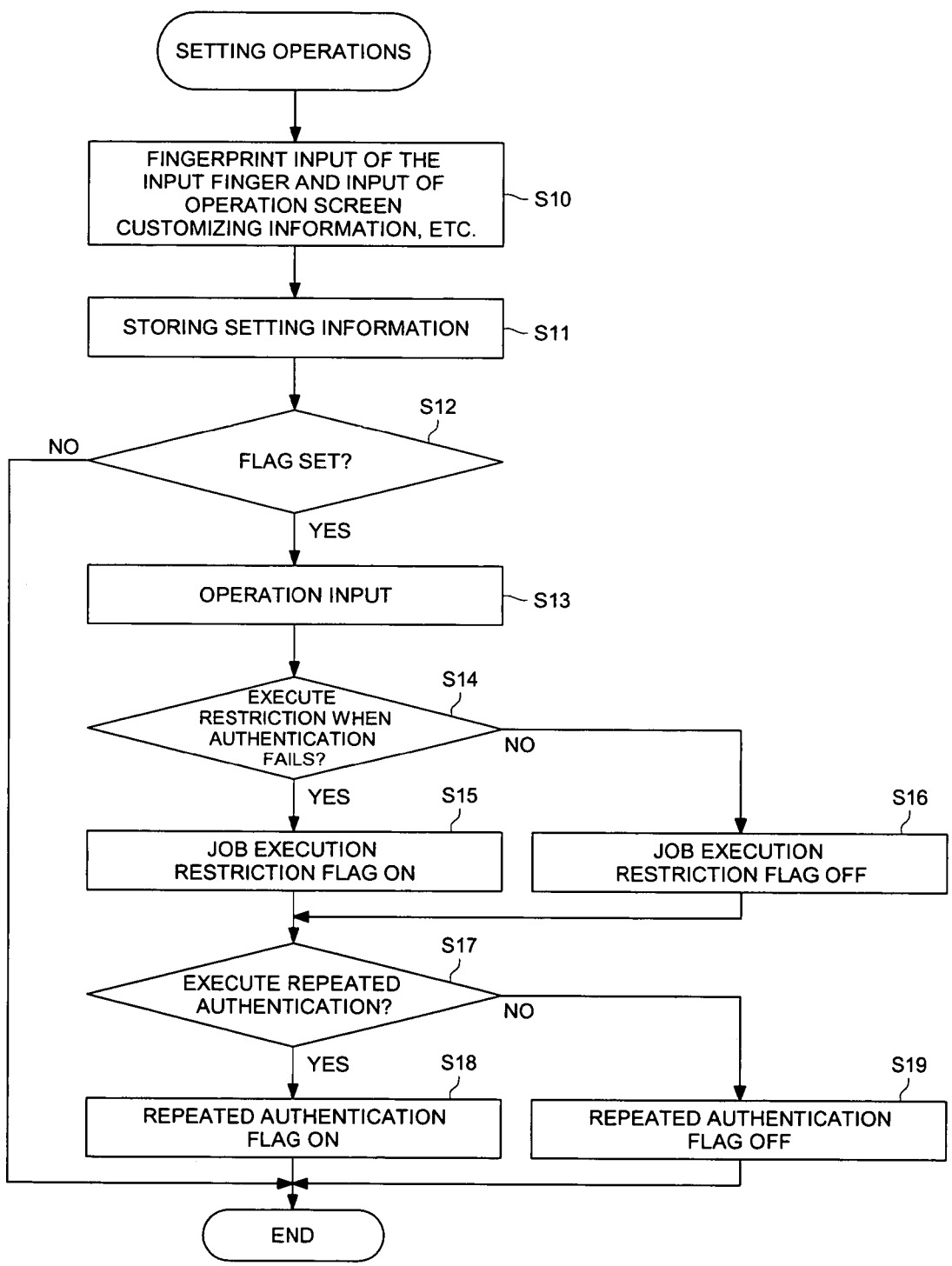
FIG. 2 is a flow chart showing setting operations.
Figure 3:
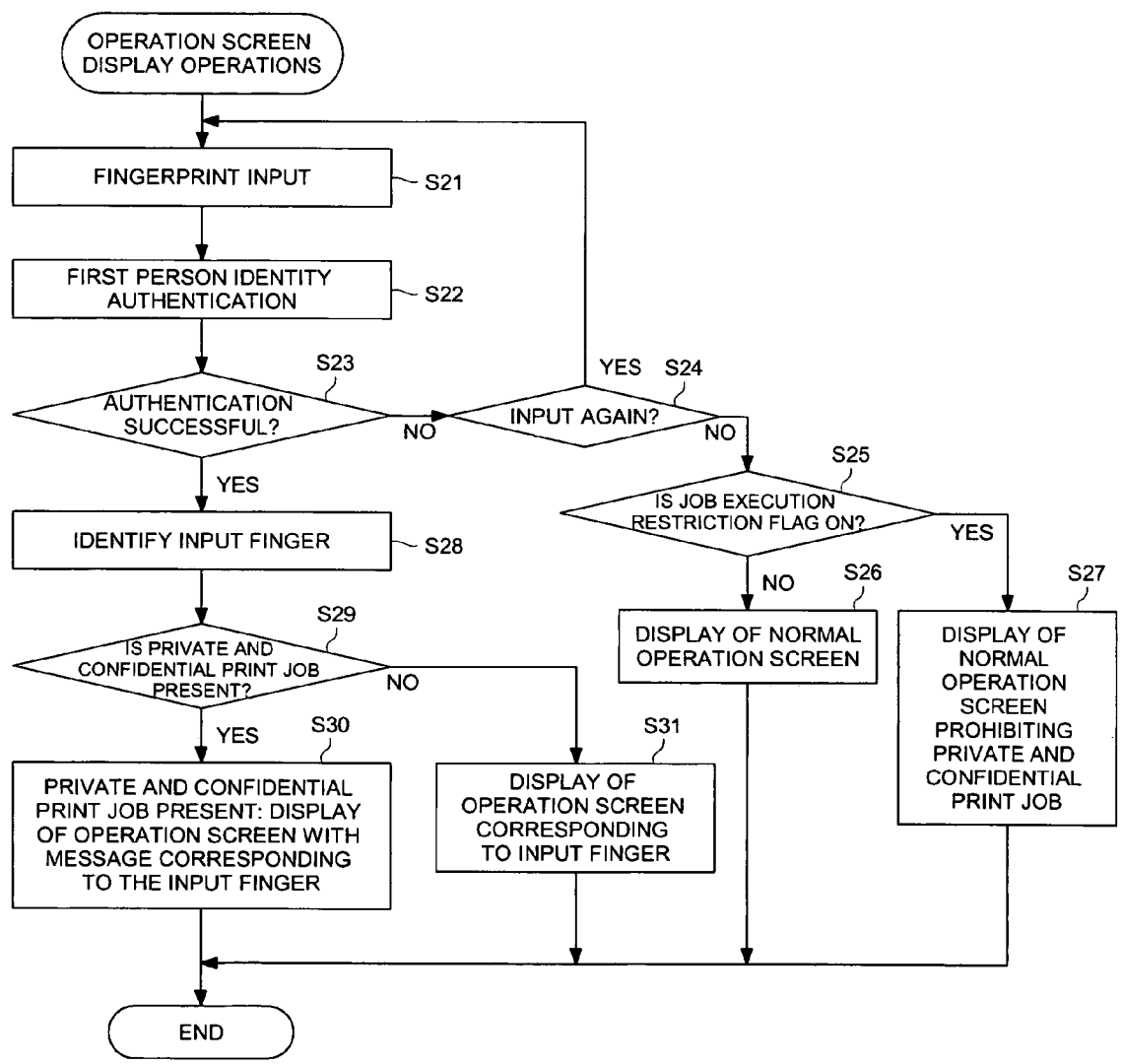
FIG. 3 is a flow chart showing operation screen display processing.
Figure 4:
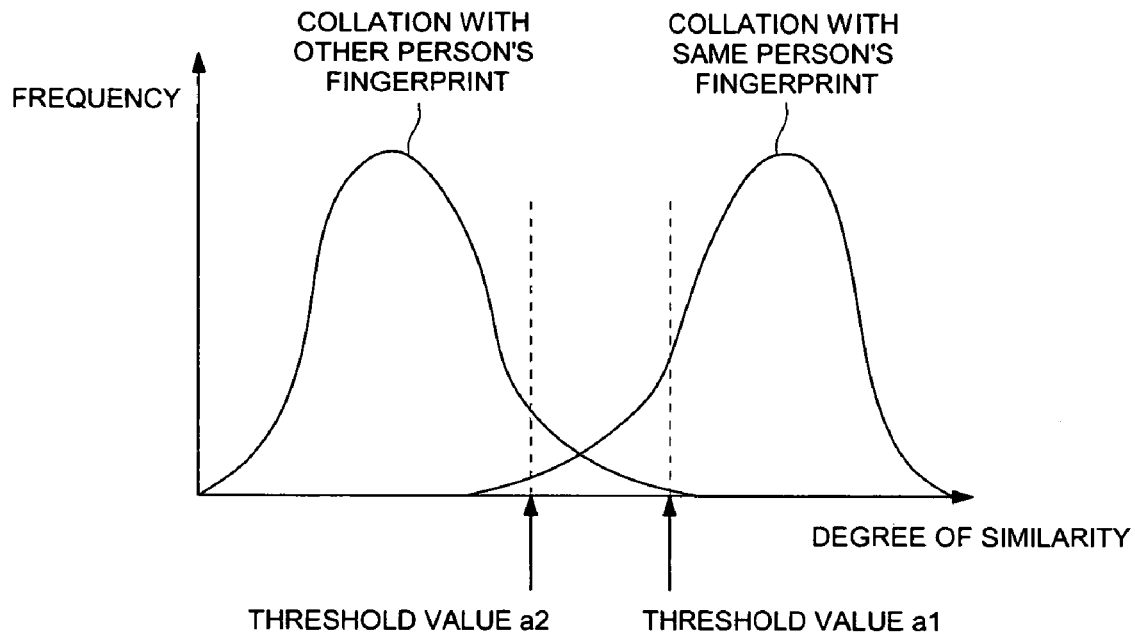
FIG. 4 is a diagram showing the distribution of the degree of similarity when carrying out person identity authentication using fingerprints.
Figure 5:
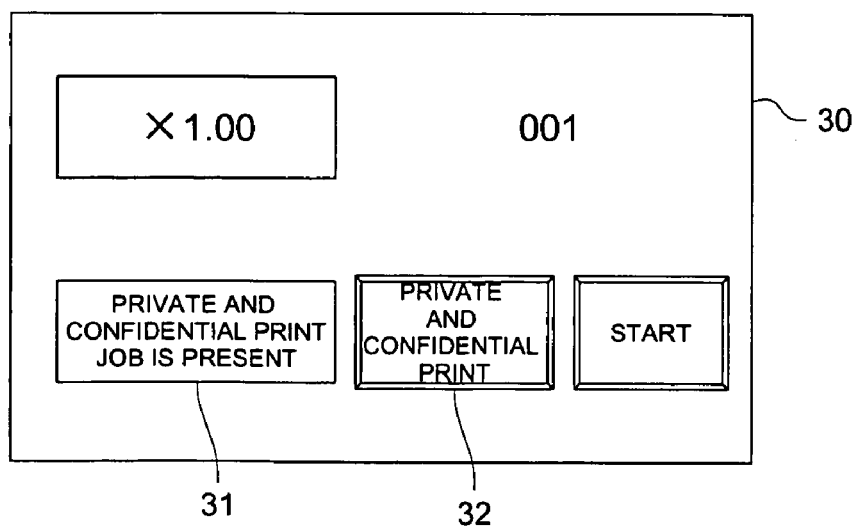
FIG. 5 is a schematic diagram of an operation screen when there is a private and confidential print job.
Figure 6:
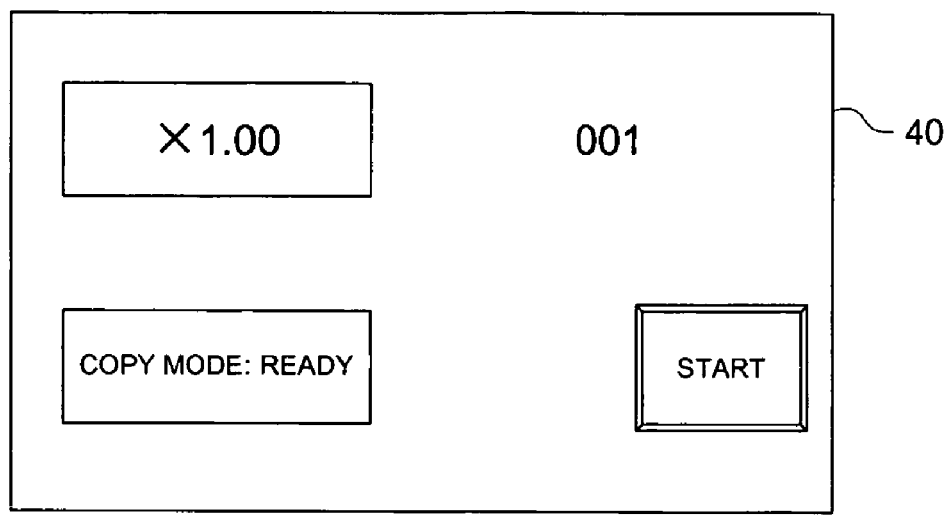
FIG. 6(*a*) is a schematic diagram of an operation screen.
Figure 6:
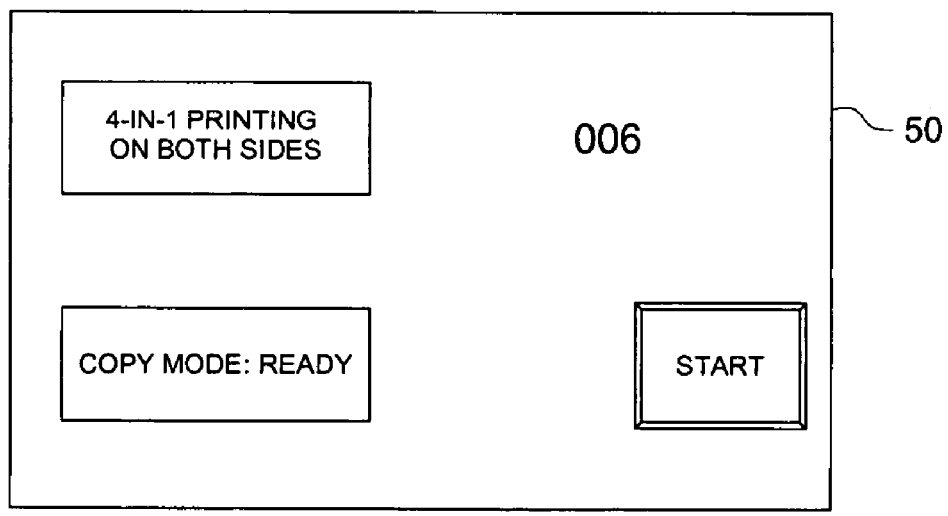
Figure 7:
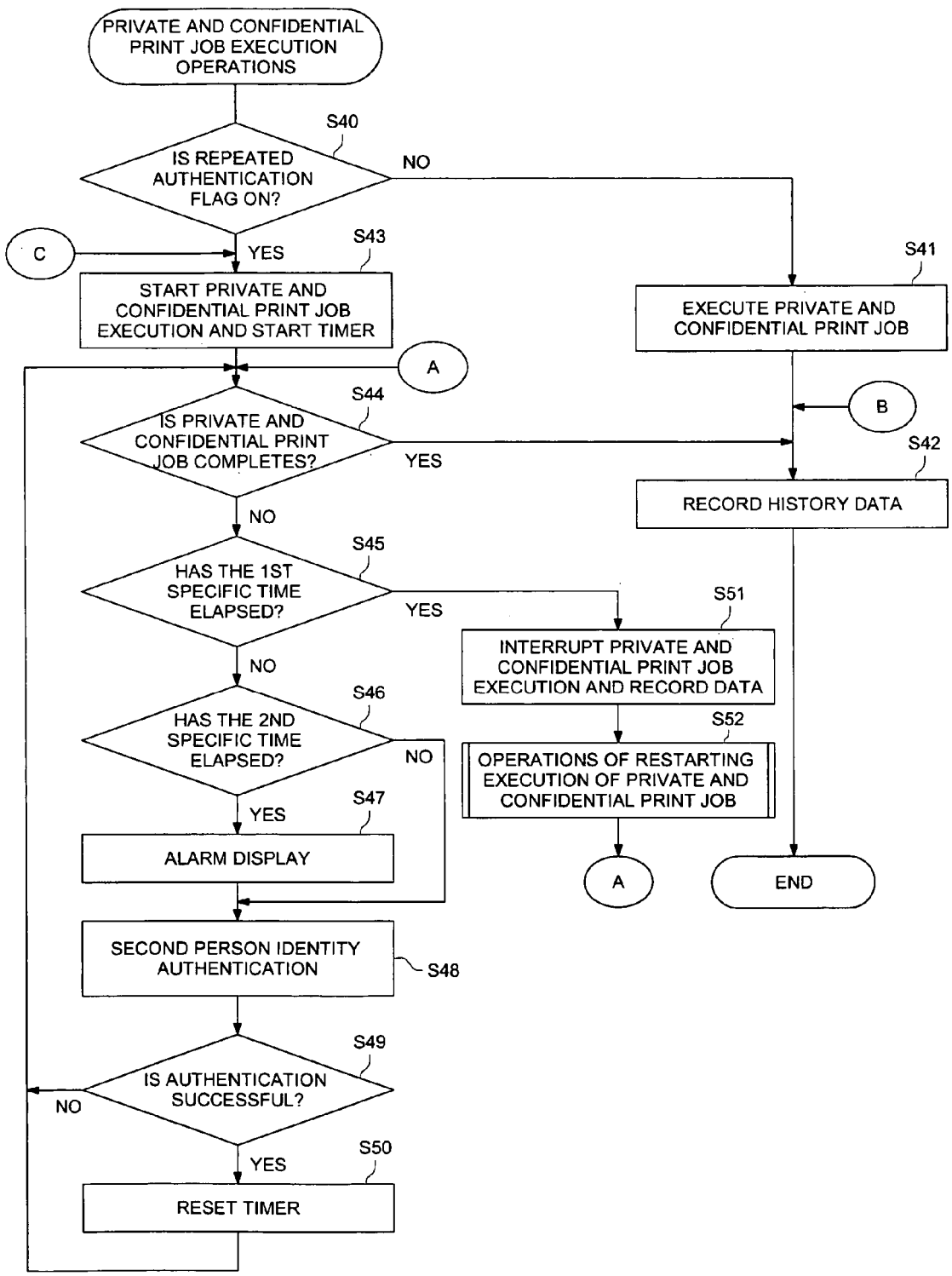
FIG. 7 is a flow chart showing the process of executing a private and confidential print job.
Figure 8:
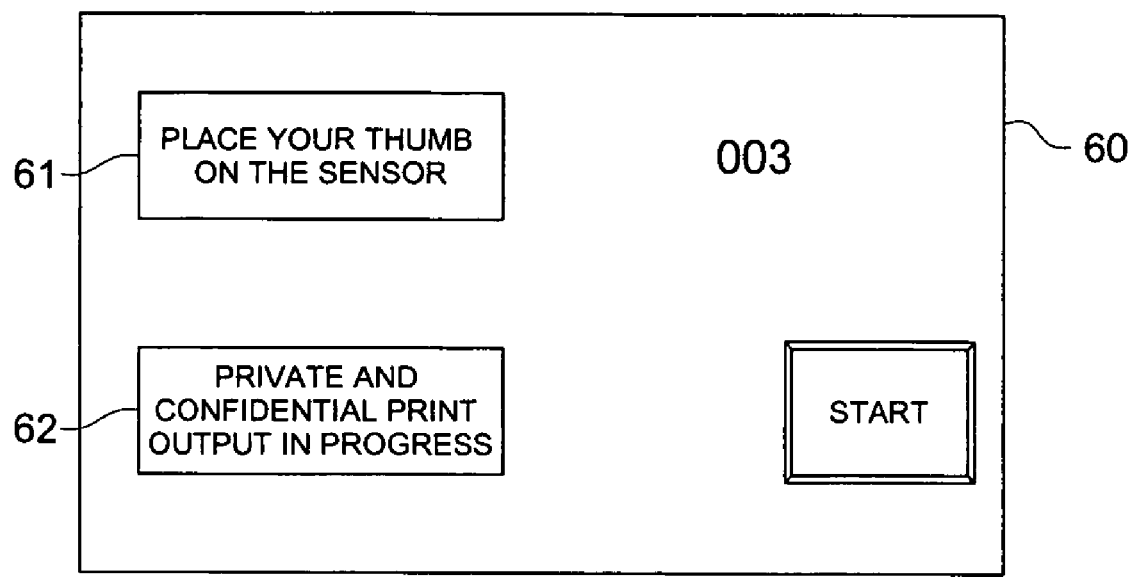
FIG. 8 is a schematic diagram of a private and confidential-print job control screen.
Figure 9:
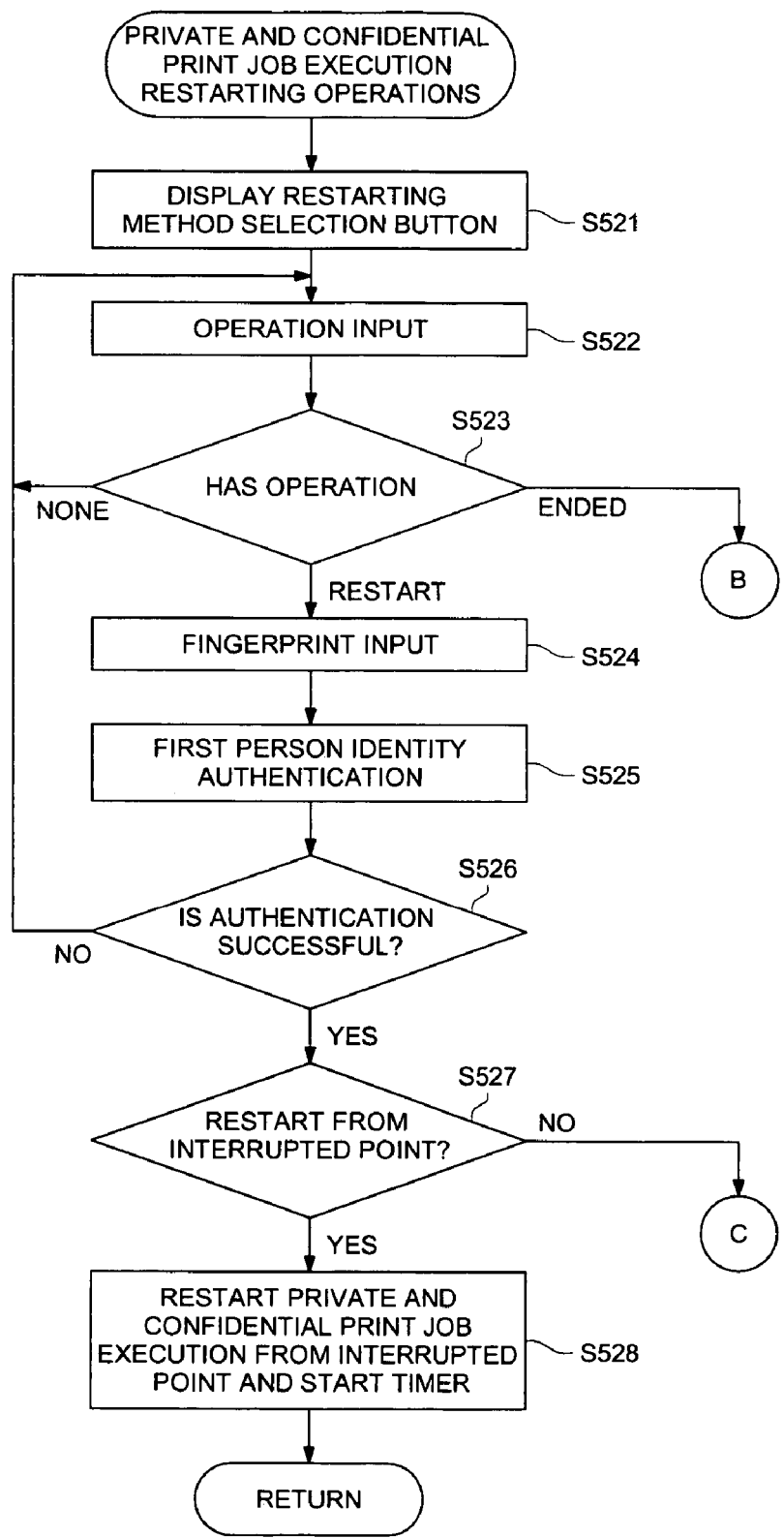
FIG. 9 is a flow chart showing the processing of restarting the execution of a private and confidential print job in the middle of execution of the private and confidential print job.

Next, the operation of MFP 100 is described below while referring to FIG. 2 to FIG. 9. The setting operations are shown in FIG. 2. FIG. 3 shows the operation screen display processing. FIG. 4 shows the distribution of degree of similarity in person identity authentication using fingerprints. FIG. 5 shows the configuration of the operation screen 30 when there is a private and confidential print job. FIGS. 6(a) and 6(b) show the configuration of the operation screen corresponding to the input finger FIG. 6(a) is the configuration of the operation screen 40, and FIG. 6(b) is the configuration of the operation screen 50. FIG. 7 shows the process of executing private and confidential print jobs. The configuration of the private and confidential print job control screen 60 is shown in FIG. 8. FIG. 9 shows the processing of restarting the execution of private and confidential print jobs during the execution of private and confidential print jobs.

The setting operations executed in the MFP 100 are explained here referring to FIG. 2. The setting operations including customizing the operation screen corresponding to the input finger, setting whether or not to enable the execution of a private and confidential print job when the personal identity authentication fails, and setting whether or not to execute repeatedly the personal identity authentication during the execution of a private and confidential print job. In the MFP 100, the setting operations are executed by the joint operation of the CPU 11 and the setting program read in from the HDD 15 or from the local memory 17 and stored in the RAM 13. The input of setting operation execution instruction input by the user via the operation section 12 triggers the setting operations. In the following, the processing of each step of the setting operation is taken as the controller 111.

A fingerprint of the input finger of the user is input from the fingerprint sensor 16, and the corresponding fingerprint data is acquired. The identification information of this input finger, the customization information of the operation screen corresponding to the this input finger, and the personal identification information of the inputting user are input via the operation section 12 (Step S1). This input finger can be specified in terms of the type of finger (thumb, forefinger, middle finger, ring finger, or little finger) with a distinction being made between the left hand and the right hand. In addition, it is possible to customize different operation screens for each input finger. Also, there is no need for customizing the operation screen for all the fingers. Further, it is also possible to have a common operation screen for several fingers.

The setting information is prepared by establishing the correspondence among the fingerprint data of input fingers, the identification information of that input finger, the customization information of the operation screen, and the user's personal identification information These are stored in the HDD 15 (Step S11).

Via the operation section 12, depending on whether or not the user has input the options of making the settings of various flags, a judgment is made as to whether or not to carry out the setting of various flags (Step S12). The setting operation is terminated if the setting of various flags is not to be made (Step S12: NO).

When the setting of various types of flags is to be made (Step S12: YES), the user inputs via the operation section 12 the option of whether or not to restrict the execution of the private and confidential print jobs when personal identity authentication fails, and the option of whether or not to execute repeatedly personal identity authentication during the execution of private and confidential print jobs (Step S13).

Based on the content of operation input in Step S13, the judgment is made as to whether or not to restrict execution of private and confidential print jobs when personal identity authentication fails (Step S14). In the case of restricting the execution of private and confidential print jobs when personal identity authentication fails (Step S14: YES), the job execution restriction flag is set to ON, indicating that the execution of the private and confidential print jobs is to be restricted when person identity authentication fails (Step S14). This setting of the flag is stored in the HDD 15 (Step S15). In case the execution of private and confidential print jobs is not to be restricted when personal identity authentication fails (Step S14: NO), the job execution restriction flag is set to OFF, and this setting of the flag is stored in the HDD 15 (Step S16).

Based on the content of operation input in Step S11, the judgment is made as to whether or not to execute repeatedly personal identity authentication during the execution of the private and confidential print jobs (Step S17). In the case personal identity authentication is to be executed repeatedly during the execution of private and confidential print jobs (Step S17: YES), the repeated authentication flag indicating the execution of repeated personal identity authentication during the execution of private and confidential print jobs is set to ON and is stored in HDD 15 (Step S18). The setting operation is then terminated. In the case repeated personal identity authentication is not to be executed during the execution of private and confidential print jobs (Step S17: NO), the repeated authentication flag is set to OFF and stored in HDD 15 (Step S19). The setting operation is then terminated.

Although, in this configuration the information stored during the setting operations is taken to be stored in the HDD 15, it is not necessary to restrict to this, but it is also possible to have a configuration in which this storing is made in the local memory 17. Further, it is also possible to have a configuration in which the settings of various flags can be made only by the manager. In addition, it is also possible to have a configuration in which in which the setting of various flags is made possible after the authentication of the fingerprint of the manager has succeeded.

The operation of displaying operation screens is described referring to FIG. 3 to FIG. 6. Operation screens may be displayed based on the result of personal identity authentication and the presence or absence of private and confidential print jobs. In the MFP 100, the operation screen display processing is executed by the combination of CPU 11 and the operation screen display program read in from the HDD 15 or the local memory 17 and stored in the RAM 13. The switching ON of the power supply (not shown in the figure) by the user or the input of operation screen display instruction via the operation section 12 triggers the operation screen display processing.

A fingerprint of the input finger of the user is input from the fingerprint sensor 16, and the corresponding fingerprint data is acquired (Step S21). Next, the first personal identity authentication is carried out (Step S22) based on (1) the fingerprint data acquired in Step S21 and (2) the fingerprint data, and the person identification information among the setting information stored in HDD 15. The degree of similarity is calculated between the fingerprint data that has been input and the fingerprint data of each user in the setting information. When there is a fingerprint data for which the degree of similarity is more than a first threshold value, those two fingerprints are considered to be identical, and the person is authenticated from the corresponding personal identification information. Further, the personal identity authentication fails when the degree of similarity is smaller than the first threshold value for all the fingerprint data in the setting information.

In addition, the first personal identity authentication is the initial personal identity authentication during the processing of the operation screen display, and the first threshold value is set at a relatively severe level. For example, FIG. 4 shows the frequency of collation with the fingerprint data of the same person and the frequency of collation between the fingerprint data of the same person and another person against the degree of similarity. In this case, the threshold value "a1" of the degree of similarity is set near the distribution for the fingerprint data of the same person.

The judgment is made of whether or not the first personal identity authentication of Step S22 has succeeded (Step S23). In case the first personal identity authentication has failed (Step S23: NO), the judgment is made as to whether or not the fingerprint is input again (Step S24) based on the presence or absence of fingerprint re-input instruction from the user via the operation section 12. In case the fingerprint has to be input again (Step S24: YES), the operation returns to Step S21.

When the fingerprint is not to be input again (Step S24: NO), the job execution restriction flag stored in the HDD 15 is referred to and the judgment is made whether it has been set ON or not (Step S25). If the job execution restriction flag has been set OFF (Step S25: NO), the normal operation screen is displayed on the display 14 (Step S26), and the operation screen display processing is terminated. From the normal operation screen it is not only possible to carry out various operations but also to carry out execution of private and confidential print jobs.

If the job execution restriction flag has been set ON (Step S25: YES), the normal operation screen with prohibition of private and confidential print jobs is displayed on display 14 (Step S27), and the operation screen display processing is terminated. The execution of private and confidential print jobs will be prohibited from the normal operation screen with prohibition of private and confidential print jobs.

When the first personal identity authentication has succeeded (Step S23: YES), the input finger is identified for the authenticated fingerprint data of the setting information (Step S28). Next, a judgment is made as to whether or not there is a private and confidential print job addressed to the authenticated user (Step S29). A private and confidential print job is considered to be present when a private and confidential print job is received, for example, from an external equipment via the communication network N and the communication section 19 and is stored in the video memory 18 or the HDD 15, or when a private and confidential print instruction is given for the image data read from a document using the scanner 20 and stored in the video memory 18 or the HDD 15. Further, when the private and confidential target user information has been included in that private and confidential print job, and when the private and confidential target user information has been referred to and is found to match with an authenticated user, then it is considered that there is a private and confidential print job addressed to that user.

When a private and confidential print job is present (Step S29: YES), the operation screen corresponding to the authenticated input finger is customized based on the operation screen customization information stored in the HDD 15, the input finger identification information of the setting information stored in the HDD 15, and on the information of the input finger identified in Step S28. Further, the message indicating that there is a private and confidential print job and the private and confidential print job shortcut button for the private and confidential printing control screen display are added to that operation screen, and that operation screen is displayed on the display 14 (Step S30). The operation display processing is then terminated. Pushing the private and confidential print job shortcut button causes a jump to the private and confidential printing control screen in order to execute the private and confidential print job. For example, the operation screen 30 shown in FIG. 5 is displayed on the display 14. The operation screen 30 corresponding to a specific finger contains the message 31 indicating that there is a private and confidential print job and the private and confidential print job shortcut button 32. The operation screen 30 is customized for printing one sheet of the same size (1.00× magnification). Further, the operation screen 30 has a printing execution start button.

When no private and confidential print job is present (Step S29: NO), the operation screen corresponding to the authenticated input finger is customized based on the operation screen customization information stored in the HDD 15, the input finger identification information of the setting information stored in the HDD 15, and the information of the input finger identified in Step S28. The corresponding operation screen is then displayed in the display 14 (Step S31), and the operation section display processing is terminated. For example, the operation screens 40 and 50 shown in FIGS. 6(*a*) and 6(*b*) are displayed on the display 14. The operation screen 40 corresponding to the right hand forefinger has been customized for printing one sheet with a 1× magnification. The operation screen 50 corresponding to the right hand thumb has been customized for 6 sheets of both sides printing at the same time in four-in-one printing mode in which reduced images of 4 sheets are printed on one recording sheet. Further, the operation screens 40 and 50 contain also a button indicating the copy mode—Ready is possible and a button for starting the print job.

At the end of operation screen display processing, the user carries out various operations via the operation section 12 based on the different operation screens displayed in the display 14.

The processing of private and confidential print job execution made in the MFP 100 is described referring to FIG. 7 to FIG. 9. Executing the private and confidential print job is processed when the job execution restriction flag is ON and there is a private and confidential print job. The execution is made in accordance with the display (Step S30 of operation screen display processing) of the operation screen corresponding to the input finger. In the MFP 100, the private and confidential print job execution processing is made by the combination of CPU 11 and the private and confidential print job execution program read in from the HDD 15 or the local memory 17 and stored in the RAM 13. Pressing the private and confidential print job shortcut button by the user via the operation section 12 triggers the private and confidential print job execution processing.

A judgment is made as to whether or not the repeated authentication flag stored the in HDD 15 has been set ON (Step S40). When the repeated authentication flag has been set OFF (Step S40: NO), the fact that the private and confidential print job is being executed is displayed on the display 14, and at the same time, the private and confidential job is executed by the printing means 21 (Step S41).

The history data of private and confidential print job execution is prepared and recorded in the HDD 15 and the local memory 17 (Step S42), and the private and confidential print job execution process is terminated. The recorded history data includes history data related to the private and confidential print job execution aborted due to failure of authentication as is described later. In this manner, by recording the history data, it is possible to simplify the management of private and confidential print job execution as well as to increase security. Further, in the recorded history data, in order to further increase security, it is desirable to include history data related to the private and confidential print job execution that was aborted due to reasons other than failure of authentication (such as the paper getting exhausted or jammed) as is described later.

When the repeated authentication flag has been set ON (Step S40: YES), the execution of the private and confidential print job is started; the display 14 displays the private and confidential print job control screen; and at the same time the dock 22 starts a timer (Step S43). This timer counts the time period during which the personal identity authentication based on a fingerprint has not succeeded, when repeated execution of person identity authentication based on a fingerprint is being made during the execution of the private and confidential print job. Further, the private and confidential print job control screen displayed in Step S43 includes, for example, as is shown in the private and confidential print job control screen 60 shown in FIG. 8, a message 61 prompting the user to place the left forefinger on the fingerprint sensor 16 and a message 62 indicating that the private and confidential print job is under execution.

Next, in the printer 21, a judgment is made as to whether or not the private and confidential print job has been completed (Step S44). If the private and confidential print job has been completed (Step S44: YES), the operation proceeds to Step S42. If the private and confidential print job has not been completed (Step S42: NO), a judgment is made as to whether or not the elapsed time counted by the timer in the clock 22 has exceeded a first specified time interval (Step S45). If the time interval during which the fingerprint authentication has not succeeded as counted by the timer is long, it is assumed that the authenticated user is not in front of the MFP 100 and hence there is the danger that the printed material is seen or stolen by a third person. In order to prevent such danger, the first specific time interval is set beforehand as the interval after which the private and confidential print job execution is terminated forcibly.

When the elapsed time counted by the timer has not exceeded the first specified time interval (Step S45: NO), a judgment is made as to whether or not the elapsed time counted by the timer has exceeded a second specified time interval (Step S46). By the second interval judgment, before the time interval counted by the timer exceeds the first specified time interval, the user is prompted to submit to fingerprint authentication. In view of this, the second specific time interval is set beforehand as the time interval for displaying the alarm message prompting the user to submit to fingerprint authentication. Further, the second specific time interval is preferably less than the first specific time interval. In addition, it is also possible to have a configuration in which the settings of the first specific time interval and the second specific time interval can be changed by an operation input from the administrator.

Furthermore, when the fingerprint sensor 16 is of the sweep type, it is desirable to make the first specific time interval and the second specific time interval longer than the corresponding values when the fingerprint sensor 16 is of the finger placement type. This is because the fingerprint input operation by the user becomes complex if the fingerprint input is made to be carried out frequently when the fingerprint sensor 16 is of the sweep type. For example, it is possible to set the first specific time interval as 15 seconds and to display the message "Enter fingerprint at least once in 10 seconds" in the private and confidential print job control screen in the display 14.

When the time interval counted by the timer has exceeded the second specific time interval (Step S46: YES), an alarm message is displayed in the display 14 prompting the user to submit to fingerprint authentication (Step S47). The alarm message can, for example, be a message such as "Printing will be aborted if there is no fingerprint input within X seconds." Here X seconds is the time remaining up to the end of the first specific time interval. Further, this alarm message, for example, can also count down the remaining time up to the end of the first specific time interval.

Next, the fingerprint of the user's input finger is input from the fingerprint sensor 16 and the corresponding fingerprint data is acquired, or the fingerprint data is not acquired. A second personal identity authentication is carried out (Step S48) based on the fingerprint data if it has been acquired, and based on the fingerprint data and person identification information in the setting information stored in the HDD 15. In specific terms, similar to the first personal identity authentication, the second personal identity authentication succeeds when there is fingerprint data in the setting information for which the degree of similarity between the fingerprint data that has been input and the fingerprint data in the setting information is equal to or more than the second threshold value. The second personal identity authentication fails when there is no fingerprint data with the degree of similarity being equal to or more than the second threshold value.

Further, the second personal identity authentication is the personal identity authentication made after the first personal identity authentication, and the second threshold value is preferably set relative to the first threshold value so that the personal identity authentication becomes successful more easily. For example, as is shown in FIG. 4, the threshold value "a2" of the degree of similarity near the distribution for comparison with some other person is set as the second threshold value. The reason for setting the second threshold value so as to make personal identity authentication to become successful more easily is that, when the fingerprint sensor 16 is of the finger placement type, the fingerprint image becomes degraded if the user places the finger on the fingerprint sensor 16 continuously during the execution of the private and confidential print job. Further, if the user is made to place the finger repeatedly on the fingerprint sensor 16, there is the likelihood that as time passes the fingerprint input by the user will not be made as accurately as during the first time.

Further to this, since the second personal identity authentication is the personal identity authentication made after the first personal identity authentication, the fingerprint data obtained from the fingerprint sensor 16 may be compared only with the fingerprint data in the setting information of the user who has been identified in the first personal identity authentication.

A judgment is made as to whether or not the second personal identity authentication has succeeded (Step S49). When the second personal identity authentication has succeeded (Step 49: YES), the time value counted by the timer in the clock 22 is reset (Step S50), and the operation proceeds to Step S44. After being reset, the timer starts counting the time again. When the second personal identity authentication has not succeeded (Step S49: NO), the operation proceeds to Step S44.

When the count of time interval in the timer exceeds the first specific time interval (Step S45: YES), the execution of the private and confidential print job that is currently being executed by the printer 21 is interrupted, and all the data of that private and confidential print job and the interrupt status information indicating the point at which the interruption took place are stored in the HDD 15 (Step S51). The operation moves to Step S51, for example, when the user has to go away for some time from the front of the MFP 100 due to some urgent work, etc. This interrupted private and confidential print job goes into the pending state and can be started again as explained later. Subsequently, the restarting operations of the private and confidential print job are executed (Step S52) and the operations move on to Step S44.

Here, referring to FIG. 9, the operations of restarting the execution of the private and confidential print job in Step S52 are explained. As is shown in FIG. 9, a selection button is displayed on the display 14 (Step S521) for selecting the method of restarting the private and confidential print job from either the method of restarting continuing from the point at which the private and confidential print job was interrupted or the method of restarting from the beginning.

Next, the user either presses the above selection button or inputs via the operation means 12 an instruction stating that the private and confidential print job is not to be restarted (Step S522). Thereafter, a judgment is made as to what was the content of the operation in Step S522 (Step S523). When no operation input has been made (Step S523: NONE), the processing returns to Step S522. When the content of operation is an instruction to terminate the private and confidential print job (Step S523: END), the processing moves on to Step S42.

When the content of operation is an instruction to restart the private and confidential print job (Step S523: RESTART), steps S524, S525, and S526 are executed. These steps S524, S525, and S526 are identical to the steps S21, S22, and S23. In this manner, by carrying out personal identity authentication at the time of restarting the private and confidential print job, it is possible to prevent that print job from being restarted by a third person and to increase the security of restarting a private and confidential print job. In addition, it is also possible to carry out a second personal identity authentication in Step S525.

When the first initial personal identity authentication has failed (Step S526: NO), the operation jumps to Step S522. When the first personal identity authentication has succeeded (Step S526: YES), based on the content of the operation made in Step S522, a judgment is made as to whether or not to restart the private and confidential print job from the point at which it was interrupted (Step S527). When the private and confidential print job is to be restarted continuing from the point at which it was interrupted (Step S527: YES), the data of the private and confidential print job and the interrupt status information stored in HDD 15 are read out; the execution of the private and confidential print job is restarted continuing from the point at which it was interrupted; the counting of the timer by the clock 22 is started (Step S528); the operation of restarting the execution of the private and confidential print job is ended; and the processing jumps to Step S44. When the execution of the private and confidential print job is not to be restarted (Step S527: NO), the processing jumps to Step S43 since the private and confidential print job is executed from the beginning.

In the operation of executing a private and confidential print job, when the personal identity authentication fails during the repeated authentication for that private and confidential print job, although the execution of the private and confidential print job is being interrupted, and when the apparatus (MFP 100) has stopped due to a reason other than the failure of authentication, it is desirable not to carry out repeated personal identity authentication. For example, if repeated personal identity authentication is carried out when the apparatus has stopped because either the recording paper has been exhausted or has jammed, the private and confidential print job will be interrupted while the user is carrying out the tasks of replenishing the recording paper or removing the jammed recording paper thereby causing inconvenience to the user. In addition, it is desirable in terms of security protection to carry out personal identity authentication using fingerprints even when the execution of a private and confidential print job is restarted after the equipment had stopped due to a reason other than failure of authentication.

As has been described above, according to the present preferred embodiment, the personal identity authentication may be based on fingerprint data, and the appropriate operation screen may be selected and displayed on the display 14 based on the result of personal identity authentication, the personal information of the authenticated person (the user), and the presence or absence of private and confidential print job addressed to the authenticated person. Therefore, it is possible to increase the ease of operation using that operation screen thereby making it possible to execute easily private and confidential print jobs and other image outputting jobs.

Further, when a private and confidential print job is present, a message indicating the fact that there is a private and confidential print job and a short-cut button to the private and confidential print job control screen may be displayed on the display 14. It is therefore possible to increase the ease of operation and to make easy the execution of the private and confidential print job.

Also, the input finger of the person may be authenticated based on the fingerprint data, and the appropriate operation screen selected and displayed from among plural operation screens based on the information of the authenticated input finger. Therefore, it is possible to further improve the ease of operation due to the selection and display of operation screens corresponding to each input finger.

Furthermore, by setting the job execution restriction flag ON or OFF, it is possible to select before starting the execution of the private and confidential print job whether or not to restrict the execution of the private and confidential print job when the personal identity authentication fails. Since the execution of the private and confidential print job may be continued or interrupted depending on that selection, it is possible to increase the ease of operation while maintaining the security of the private and confidential print job.

In addition, during the execution of the private and confidential print job, the personal identity authentication may be based on the fingerprint data of that person, and according to the result of authentication of that person, judgment may be made as to whether to continue or to interrupt the execution of said image outputting job. Based on the result of that judgment, the image outputting job may be executed or interrupted. The personal identity authentication may be carried out repeatedly during the execution of a private and confidential print job, and the execution of the private and confidential print job interrupted when that person identity authentication fails. Thus, the security of the private and confidential prints during the execution of a private and confidential print job increases. For example, the private and confidential printed material can not be or stolen by a third person when the authenticated person goes away from the front of the image forming apparatus.

Further, before starting the execution of a private and confidential print job, personal identity authentication may be made based on the fingerprint data of that person, and based on the result of that personal identity authentication, a judgment is made as to whether to start or to interrupt the execution of the private and confidential print job. The private and confidential print job may be either executed or interrupted based on the result of that judgment. It is therefore possible to increase the security of the private and confidential printing at the time of starting the execution of a private and confidential print job.

Also, the threshold value of the degree of similarity of fingerprint data during the second personal identity authentication may be set larger than the threshold value during the first personal identity authentication thereby making it easier for the person identity authentication to succeed when it is being carried out repeatedly during the execution of the private and confidential print job as compared to the person identity authentication done at the time of starting the execution of the private and confidential print job. The user thus enters the fingerprint data easily during the execution of the private and confidential print job thereby avoiding the frequent occurrence of person identity authentication failures.

In addition, setting making the repeated authentication flag ON or OFF selects whether or not to carry out repeated personal identity authentication during the execution of a private and confidential print job. It is therefore possible to select and set whether to increase the security of the private and confidential print job or to increase the ease of operation.

Furthermore, when interrupting the execution of a private and confidential print job, the private and confidential print job is stored along with the corresponding interrupt status information. When the execution of that private and confidential print job is restarted, by pressing the restarting method selection button displayed on the display 14, the execution of the private and confidential print job may restart either continuing from the point at which it was interrupted or from the beginning. It is therefore not only possible to increase the ease of operation at the time of restarting the execution of the private and confidential print job, but it is also possible to prevent wasteful printing operations.

In addition, in the above preferred embodiment, the fingerprint sensor 16 is used to gather the personal identification information and the personal identity authentication is made using fingerprint data. However, it is not necessary to restrict the present invention to this configuration. For example, some other method of personal identity authentication may be used, such as authentication based on password input, authentication based on signature (handwriting) input, iris authentication, retina authentication, facial feature authentication, authentication using hardware such as an IC card, etc. In addition, the personal identity authentication may be made using other personal identity authentication methods when the default personal identity authentication such as using fingerprint data has failed. For example, when the first or second personal identity authentication is made using fingerprint data as the default method of authentication, if the user's fingers are dry there may be cases when the authentication does not succeed even if it is a proper user, and this latter configuration will be useful in such cases. For instance, in accordance with the computer program, the CPU 11 may switch the personal identify authentication method from fingerprint identification with the fingerprint sensor 16 to password identification with the operation section 12, when it is determined that the fingerprint data from the fingerprint sensor 16 does not match with any fingerprint data stored in the HDD 15. The option to allow the alternative personal identity authentication method may be user selectable. For instance, the user may set this option in the setting operations explained in connection with the FIG. 2.

Further, although in the above preferred embodiment, the second personal identity authentication was made repeatedly in time during the execution of the private and confidential print job, it is not necessary to restrict the present invention to this configuration. For example, the second and subsequent personal identity authentication may be done for each page or once for every specific number of pages of the private and confidential print job. It is desirable to carry out the second and subsequent personal identity authentication at a frequency that does not cause jamming of the printed paper.

In addition, it is possible to have a configuration in which the job execution restriction flag and the repeated authentication flag used in the above preferred embodiment can be set separately for each job, for each individual person, or for each time slot of use, etc. For example, when making repeated personal identity authentication for each private and confidential print job, at least two levels of security may be set for the private and confidential print job. The repeated authentication flag is set ON when the security set for the private and confidential print job is high, and the repeated authentication flag is set OFF when the security set for the private and confidential print job is low. In this case, since the frequency of repetition of personal identity authentication can be changed according to the level of security setting of the private and confidential print job, it is possible not only to acquire security of the private and confidential prints but also to increase the ease of operation.

The foregoing has described principles, preferred embodiments and modes of operation of the invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the invention as defined by the following claims and equivalents thereof.

What is claimed is:

1. An image forming apparatus for printing a confidential image on a recording medium, comprising:
   a display;
   a printer for printing images in a queue;
   a storage for storing fingerprint data of each user as reference data;
   an input for receiving fingerprint data for a user;
   a timer for counting a first specified time interval and a second specified time interval shorter than the first specified time interval, the timer starting when the printer starts printing a confidential image; and
   a processor for determining whether the fingerprint data from the input corresponds to the reference data in the storage by (i) calculating a degree of similarity between the fingerprint data from the input and the reference data, and (ii) determining whether the degree of similarity is more than a first threshold value or a second threshold value, and for enabling the printer to print the confidential image if the fingerprint data from the input corresponds to the reference data in the storage;
   wherein the display prompts the user to re-enter the fingerprint data for the user when the timer has counted the second specified time interval and while the printer prints the confidential image, wherein the processor disables the printer from printing confidential information if the input does not receive re-entered fingerprint data from the user that corresponds to the reference data in the storage within the first specified time interval, and resets the timer when the processor determines that the re-entered fingerprint data from the input corresponds to the reference data in the storage, and wherein the second threshold value used for determining whether a degree of similarity between the re-entered fingerprint data and the reference data is more than the second threshold value is lower than the first threshold value used for determining whether the degree of similarity between initial fingerprint data and the reference data is more than the first threshold value, so as to make a successful personal authentication for the re-entered fingerprint data by the processor easier.

2. The image forming apparatus of claim 1, wherein the storage stores the reference data for a specified user related to a specified confidential image, and wherein the processor enables the printer to print the specified confidential image only if the fingerprint data from the input corresponds to the reference data in the storage for the specified user.

3. The image forming apparatus of claim 1, wherein the input comprises a fingerprint sensor.

4. The image forming apparatus of claim 1, wherein the printer prints confidential images on a recording medium and prints non-confidential images on a recording medium.

5. The image forming apparatus of claim 4, wherein the queue includes both a confidential image and a non-confidential image and wherein the display presents a choice to print the confidential image first or the non-confidential image first.

6. The image forming apparatus of claim 1, wherein the storage is provided in the image forming apparatus.

7. The image forming apparatus of claim 1, wherein the storage stores identification information for a plurality of users.

8. A method for printing a confidential image on a recording medium, the method comprising the steps of:
   receiving confidential image information;
   receiving fingerprint data from a user;
   determining whether the fingerprint data from the user corresponds to reference fingerprint data by (i) calculating a degree of similarity between the received fingerprint data from the user and the reference data, and (ii) determining whether the degree of similarity is more than a first threshold value or a second threshold value;
   enabling the printer to print the confidential image if the fingerprint data from the user corresponds to the reference fingerprint data;
   counting a first specified time interval and a second specified time interval shorter than the first specified time interval from a time when the printer starts printing the confidential image;
   prompting the user to re-enter the fingerprint data for the user, when the second time interval is counted and while the printer prints the confidential image;
   disabling the printer from printing confidential information if re-entered fingerprint data from the user that corresponds to the reference fingerprint data is not received within the first specified time interval;
   resetting the counting if the re-entered fingerprint data correspond to the reference fingerprint data; and
   wherein the second threshold value for determining whether a degree of similarity between the re-entered fingerprint data and the reference data is more than the second threshold value is lower than the first threshold value used for determining whether the degree of similarity between the initial fingerprint data and the reference data is more than the first threshold value, so as to make a successful personal authentication for the re-entered fingerprint data by the processor easier.

9. The method of claim 8, wherein the reference fingerprint data corresponds to a specified user and a specified confidential image.

10. The method of claim 8, further comprising repeatedly prompting the user to re-enter the fingerprint data for the user until the printer completes printing the confidential image.

11. The apparatus of claim 1, further comprising a timer which starts at a time when the printer starts printing the confidential image, wherein the processor resets the timer when the input receives the re-entered fingerprint data from the user that corresponds to the reference data.

* * * * *